Figures 1, 2:
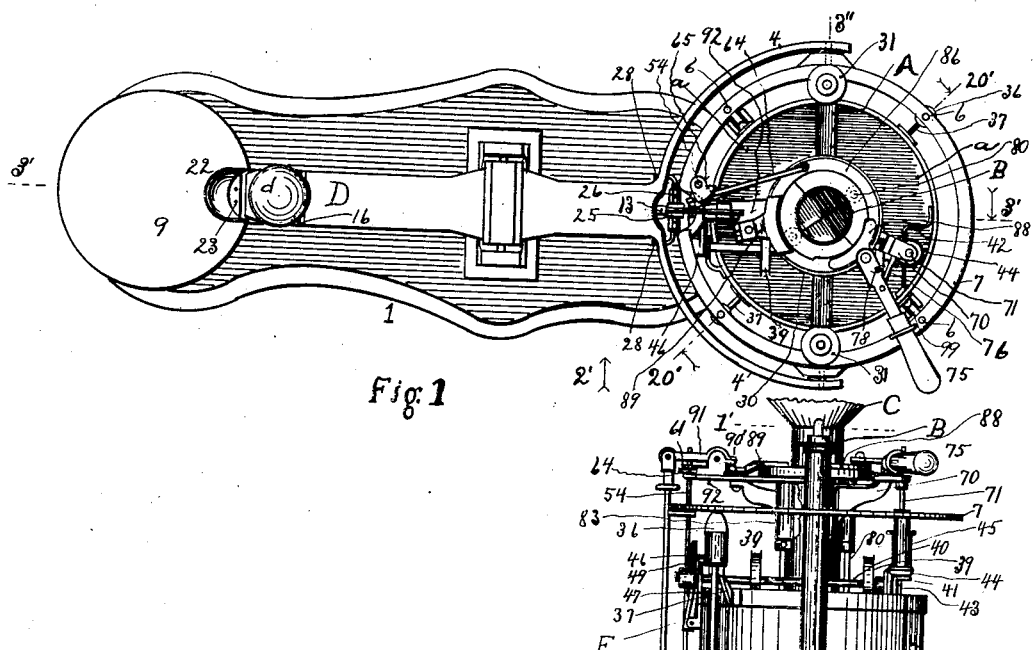

No. 897,855. PATENTED SEPT. 1, 1908.
C. D. SCOTT.
AUTOMATIC WEIGHING MACHINE.
APPLICATION FILED JUNE 3, 1907.

11 SHEETS—SHEET 1.

Witnesses
J. T. Fisher
E. J. Rosen

Inventor
Charles D. Scott
By J. A. Rosen atty

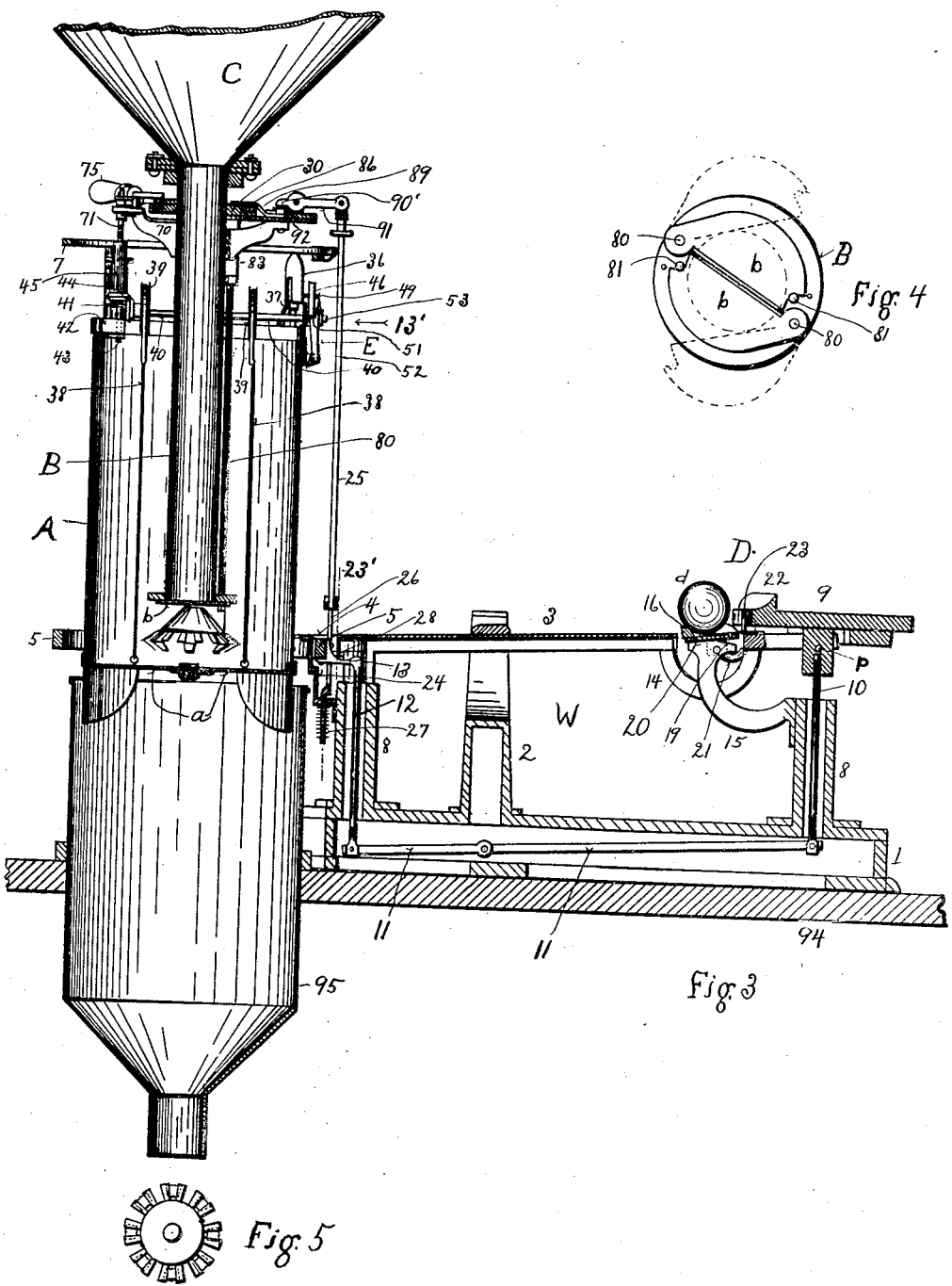

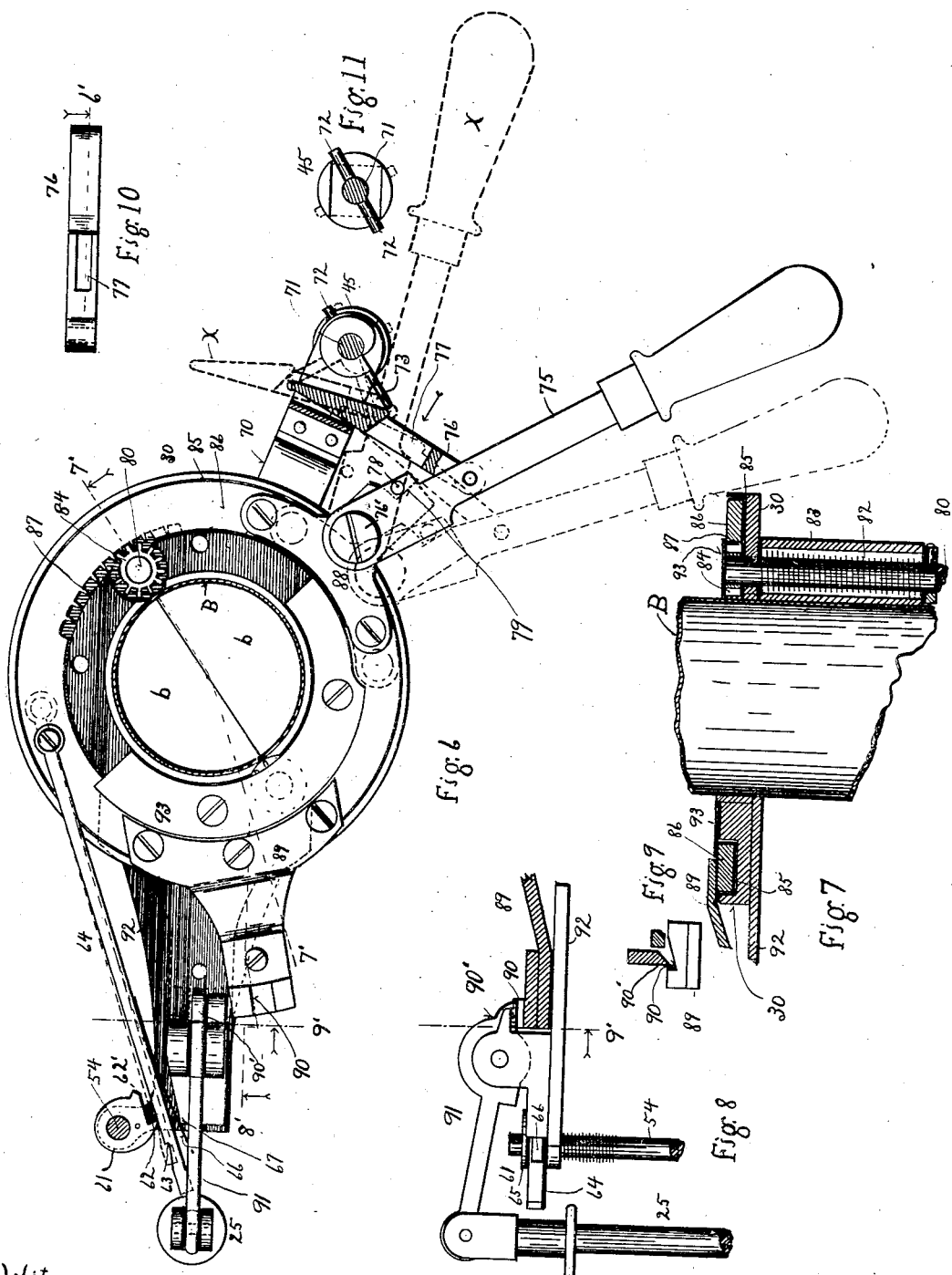

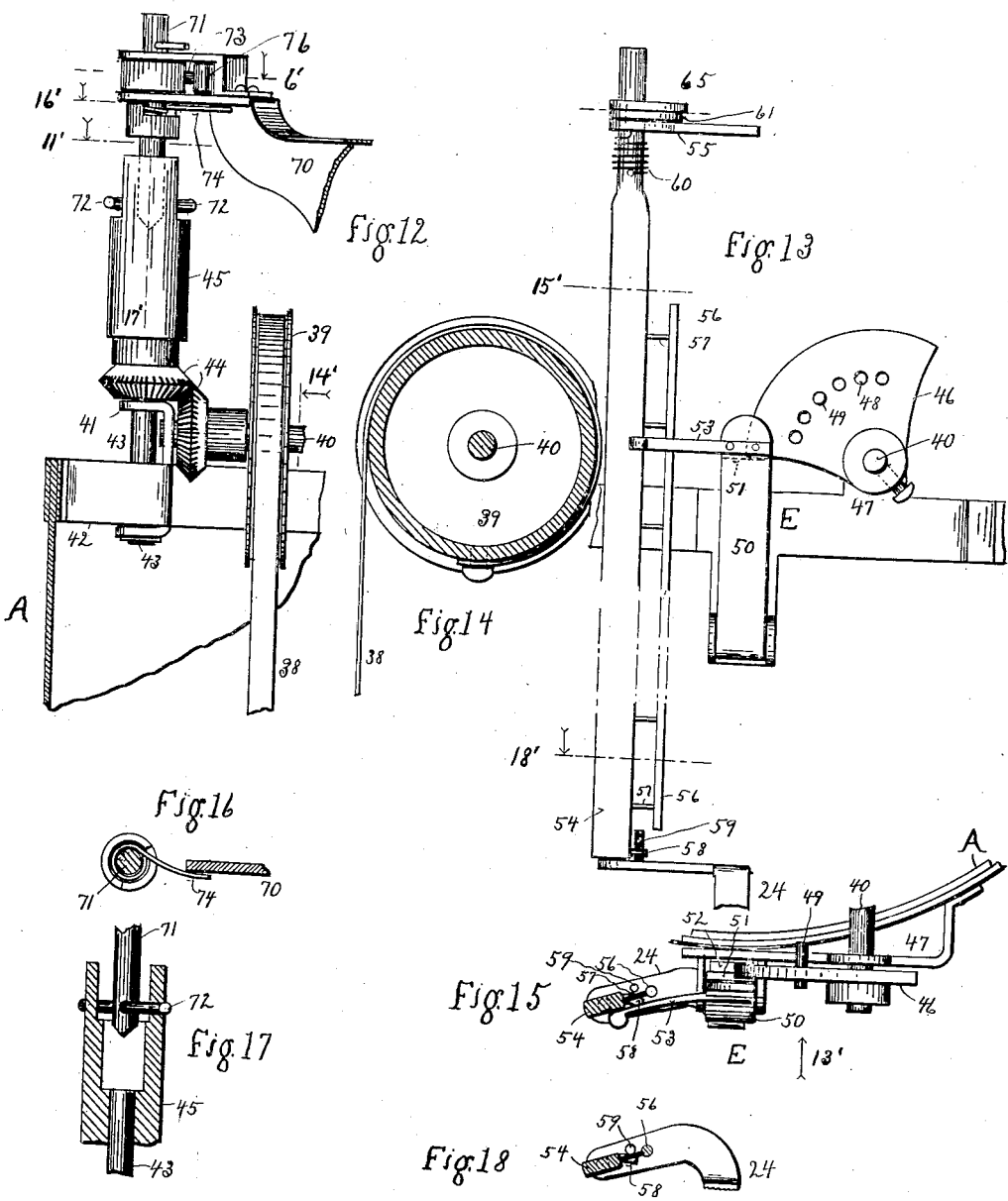

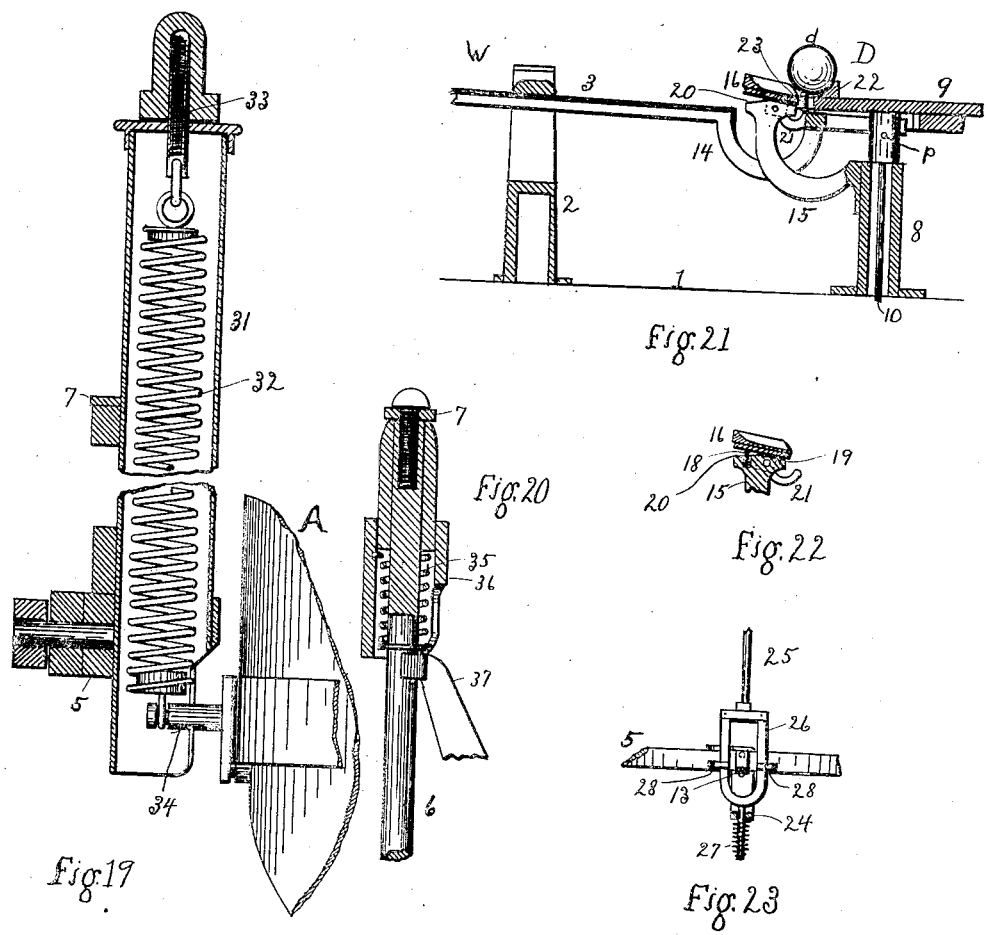

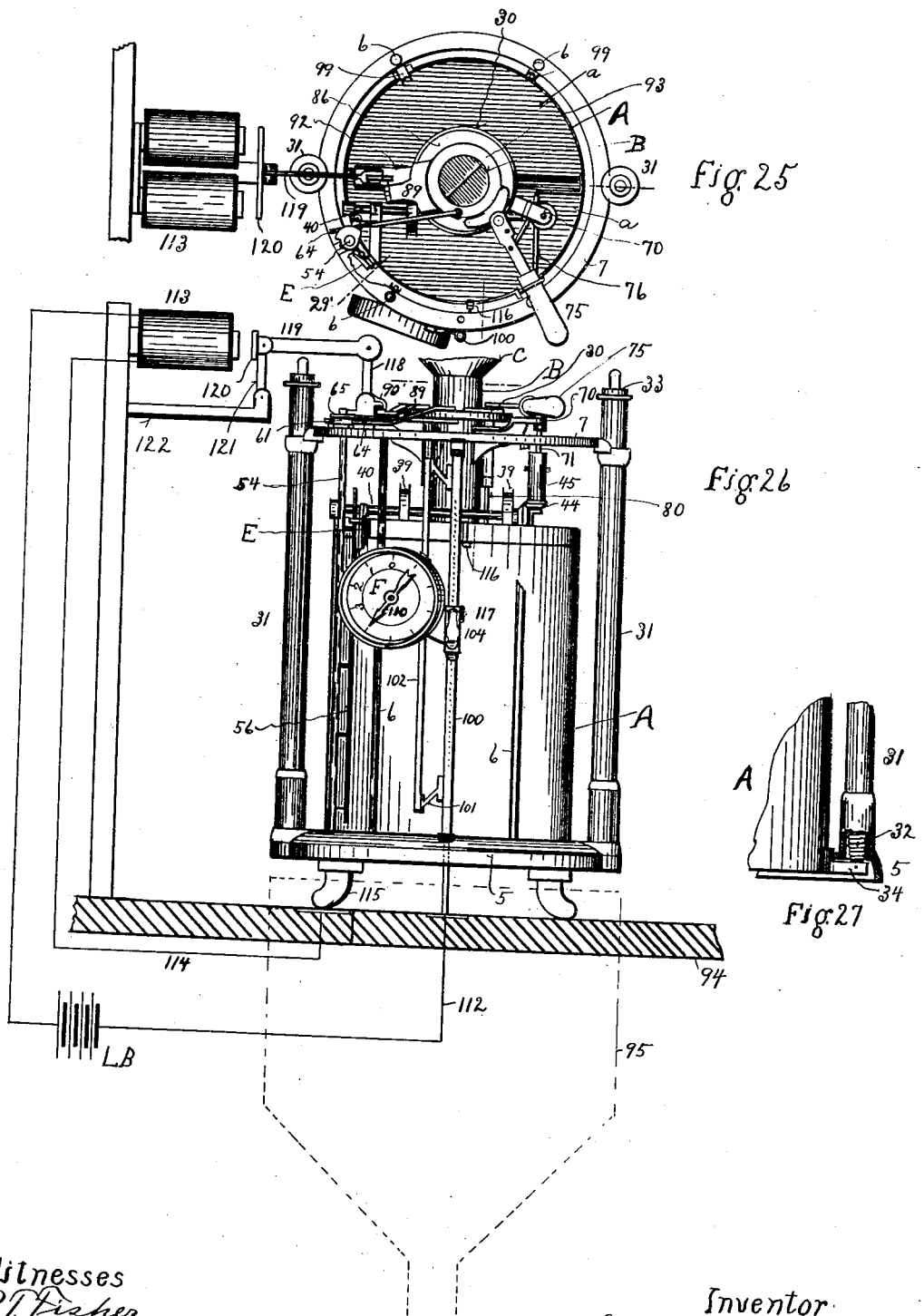

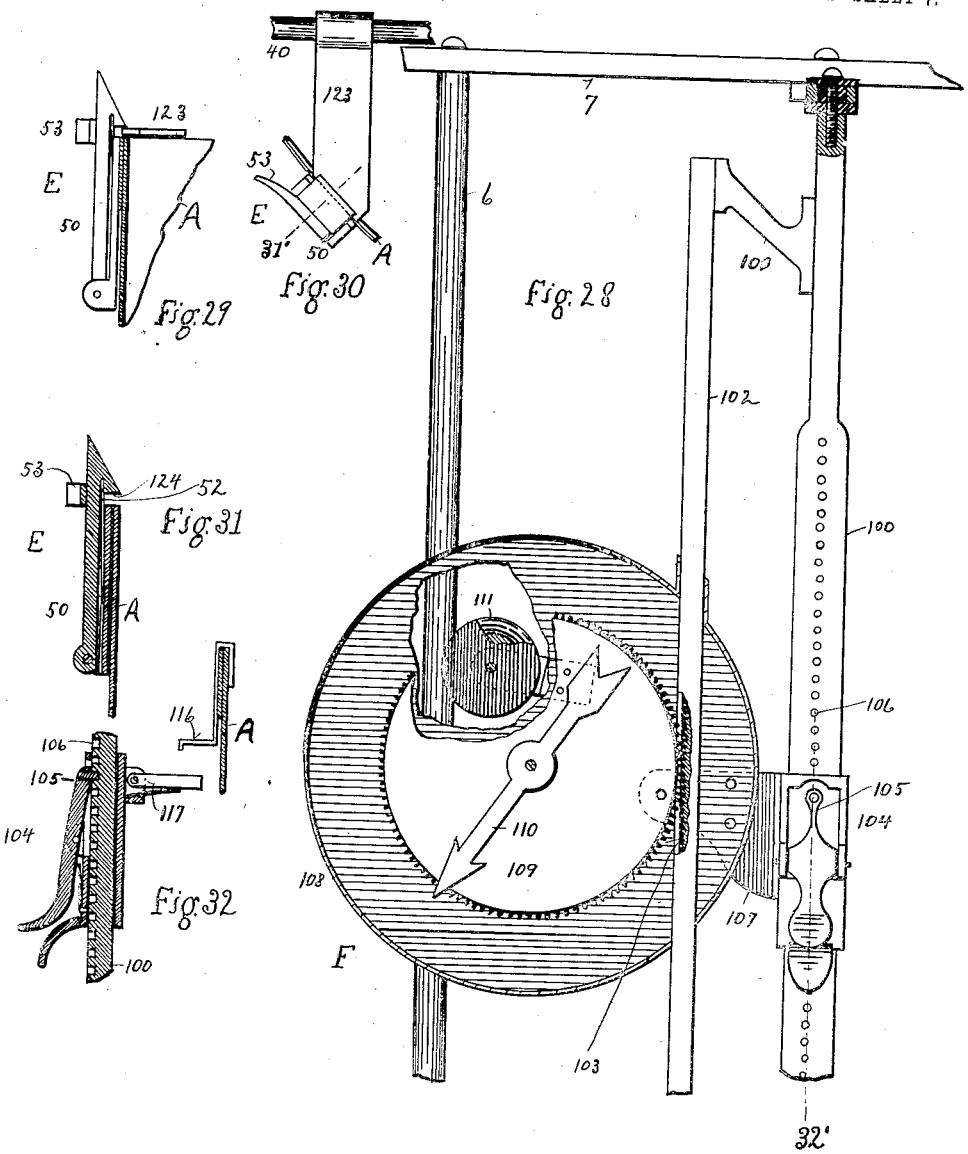

No. 897,855. PATENTED SEPT. 1, 1908.
C. D. SCOTT.
AUTOMATIC WEIGHING MACHINE.
APPLICATION FILED JUNE 3, 1907.
11 SHEETS—SHEET 8.
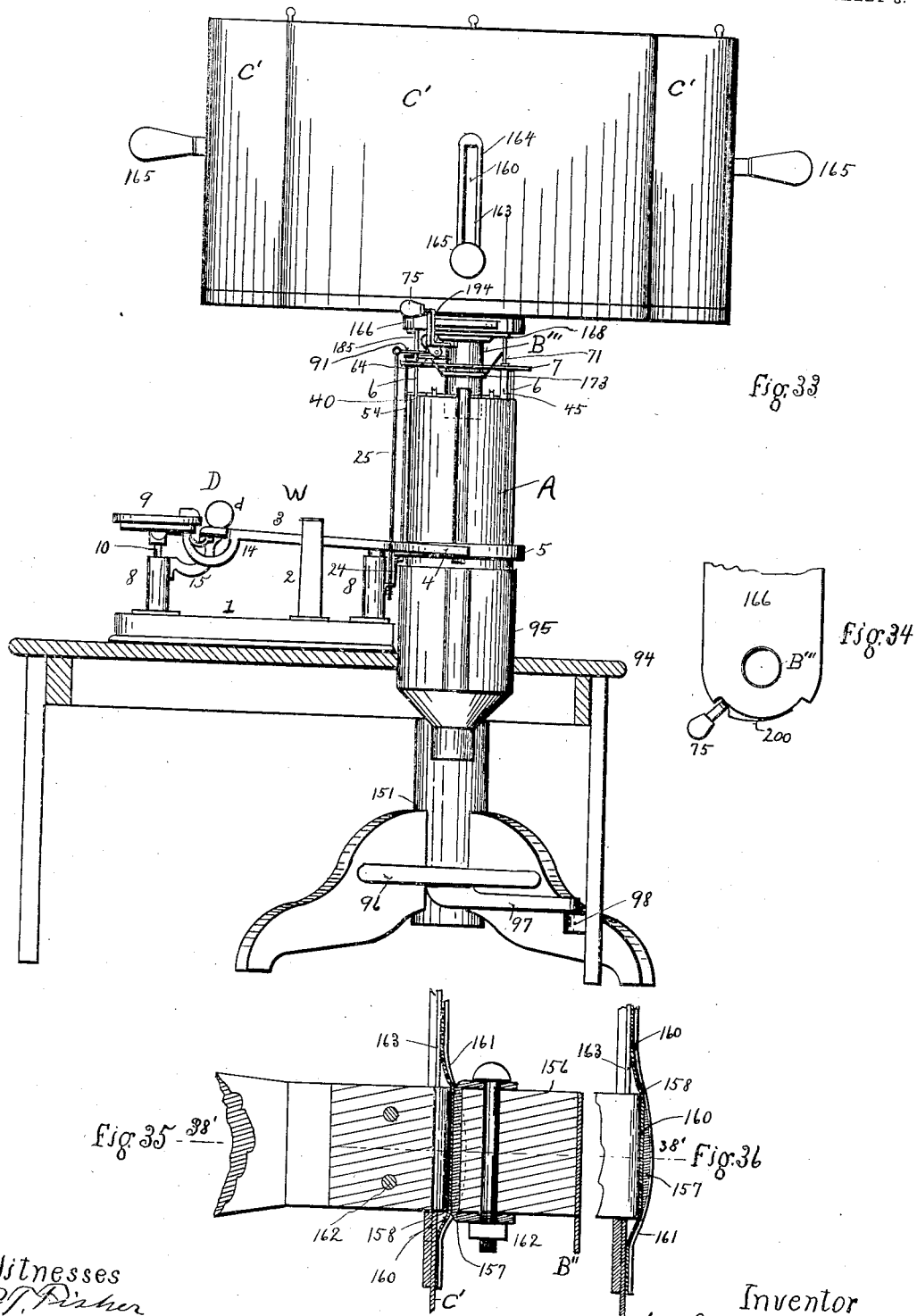

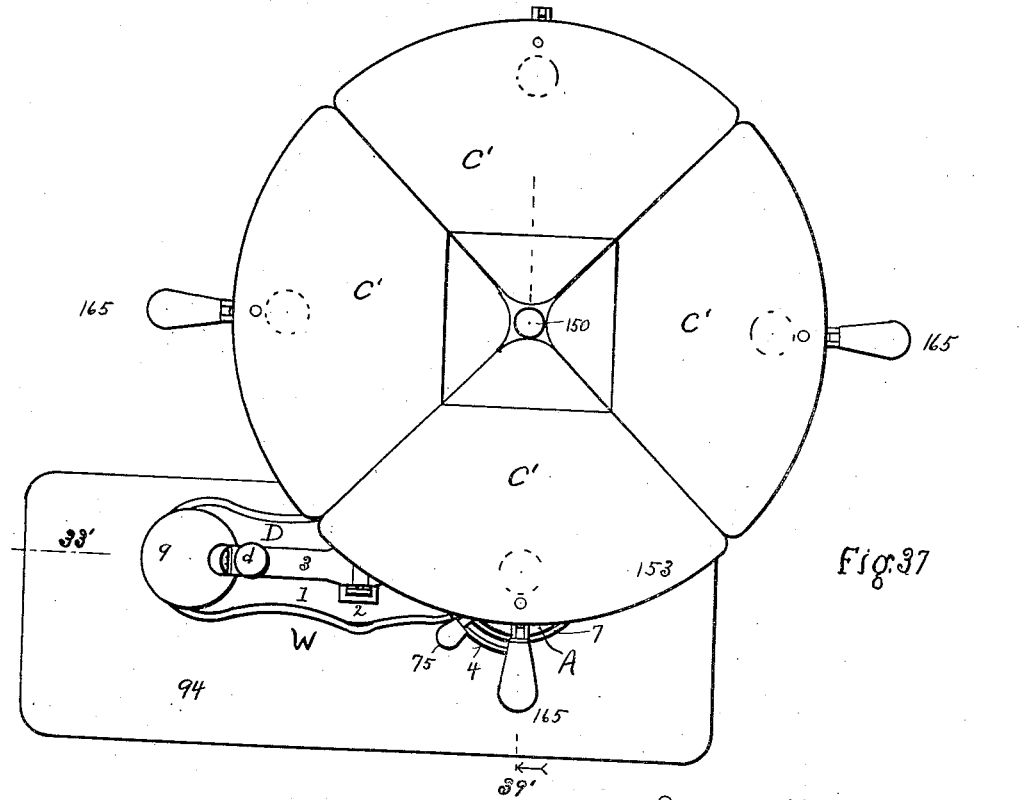
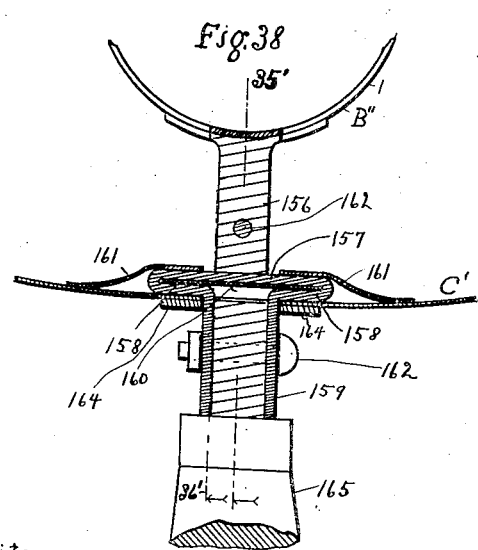
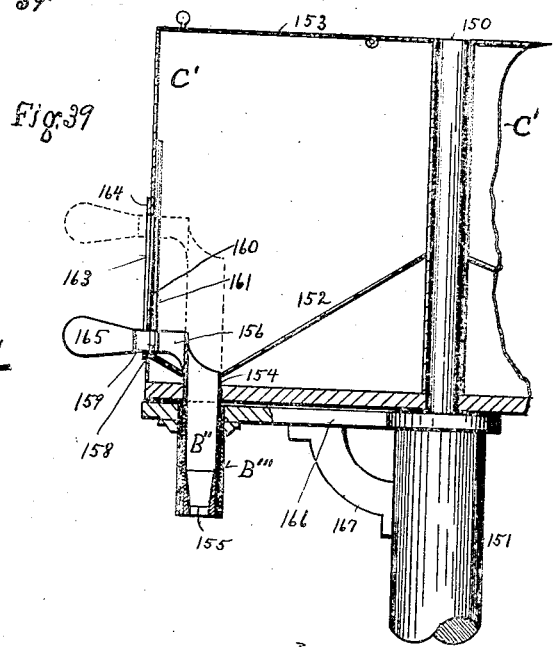

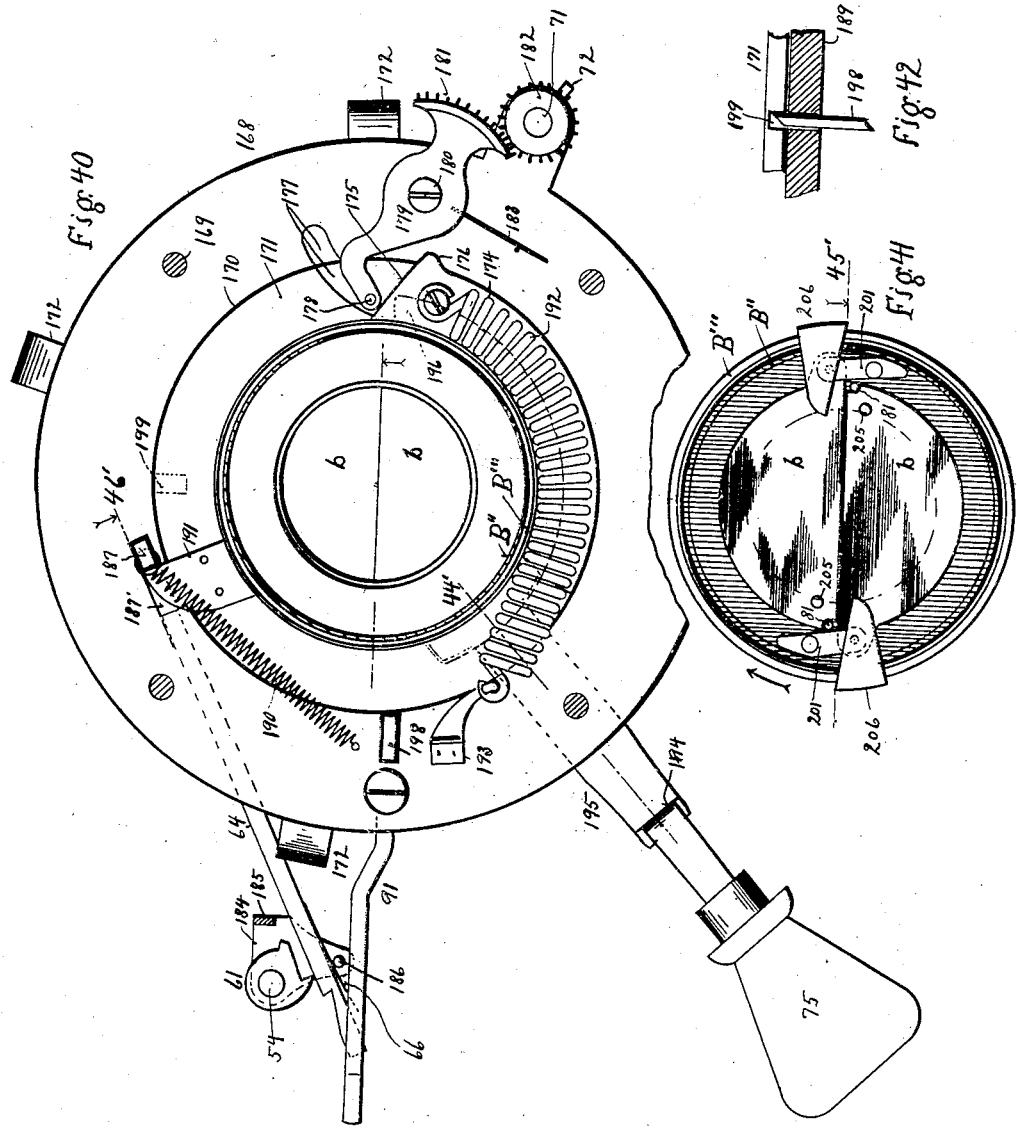

No. 897,855.
PATENTED SEPT. 1, 1908.
C. D. SCOTT.
AUTOMATIC WEIGHING MACHINE.
APPLICATION FILED JUNE 3, 1907.
11 SHEETS—SHEET 11.
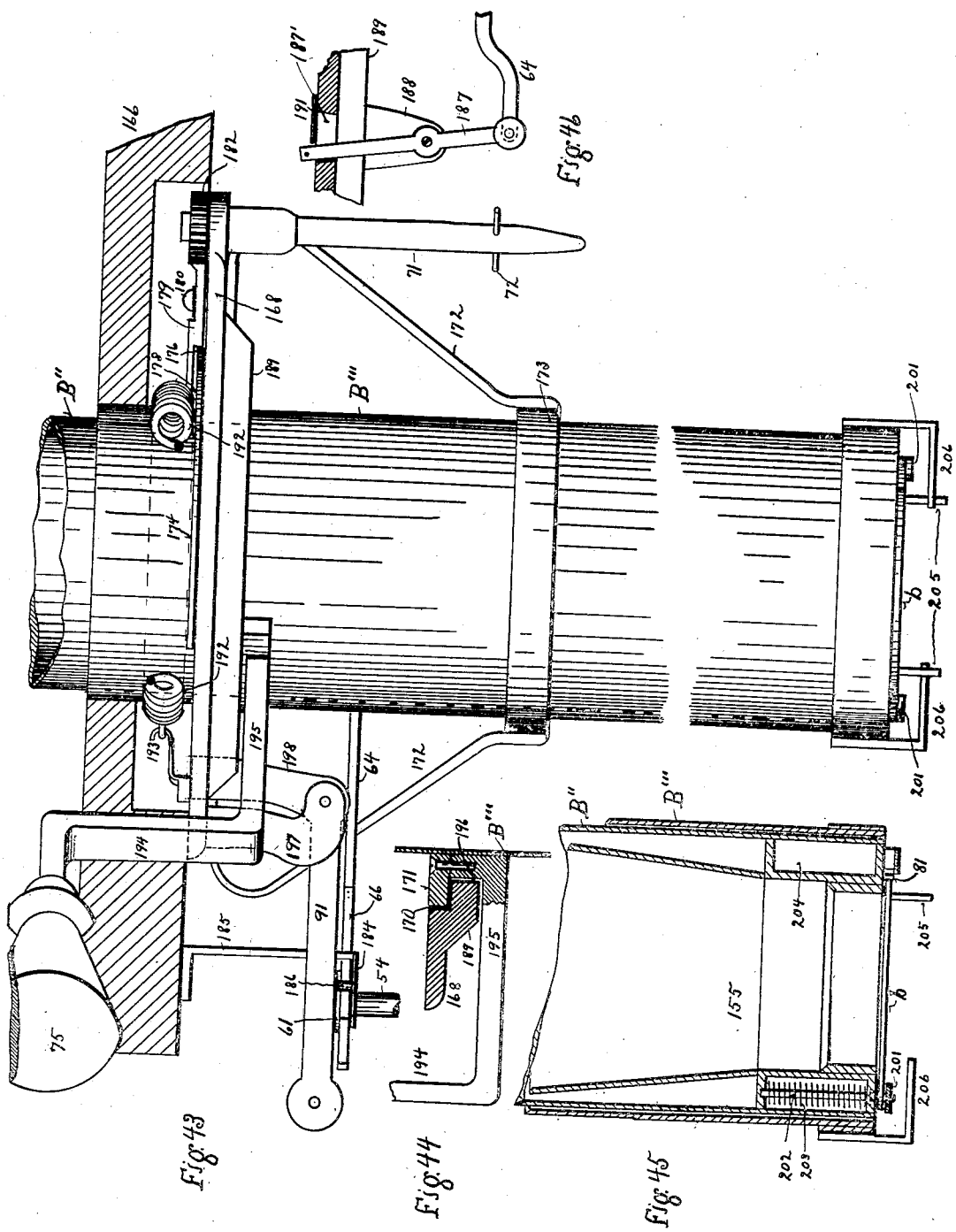
Witnesses
Inventor
Charles D. Scott
By J. U. Rosen atty

UNITED STATES PATENT OFFICE.

CHARLES D. SCOTT, OF TOPEKA, KANSAS.

AUTOMATIC WEIGHING-MACHINE.

No. 897,855.  Specification of Letters Patent.  Patented Sept. 1, 1908.

Application filed June 3, 1907. Serial No. 377,115.

*To all whom it may concern:*

Be it known that I, CHARLES D. SCOTT, a citizen of the United States, residing at Topeka, in the county of Shawnee and State of Kansas, have invented new and useful Improvements in Automatic Weighing - Machines, of which the following is a specification.

My invention relates to automatic weighing machines adapted to be placed between the reservoir in which the commodity to be weighed is contained and the bag, or can, or other receptacle in which it is desired to deliver the commodity after having been weighed.

It is adapted especially for retail stores and the like where it is desired to measure out small quantities of articles which will flow, such as sugar, coffee, and the like, and where it is desired to deliver such goods either a single package at a time or many packages, and where it is also desired to measure out different quantities.

By adjusting the weights, just as on any ordinary weighing machine, my machine is adapted to discharge the commodity from the main reservoir through a conveyer into a weighing-can mounted on the scale, and to automatically cut off the flow and discharge the weighed quantity into its final receptacle, and also at the same time to restore all the parts to their initial position. The operation is effected, so far as the operator is concerned by the simple movement of a lever.

Objects are to provide in such an apparatus a means for cutting off the flow so that the weighing will be accurate; to provide for the simultaneous cutting off of the inflow into the weighing can and the opening of the outflow from the weighing can into the final receptacle and the restoration of the several parts to their initial position, all automatically, when the desired weight shall have flowed into the weighing can; to improve generally upon weighing machines and the several parts thereof, so as to render the automatic action certain, simple, and reliable.

The invention consists of the several parts, improvements, and combinations herein described and claimed.

In an application filed by me July 20, 1908, Serial No. 444,363, for an automatic weighing apparatus, to which reference is hereby made, I have shown and claimed broadly the features relating to the weight-shifting element which are shown and not claimed in this specification.

In the drawings accompanying and forming part of this specification and in the description thereof, I have shown my invention in some of its preferred forms, and have shown the best mode of applying the principles thereof; but it is to be understood that the invention itself is not confined to these drawings and the description of the drawings, that it may be applied to other uses, that parts and combinations as herein separately claimed may be used with or without other connecting parts of similar general nature to those herein described, and that I contemplate changes in form, proportions, materials, and arrangement, the transposition of parts, and the substitution of equivalent members, without departing from the spirit of the invention.

Figure 1 is a plan view of a preferred form of the embodiment of my invention, the main feed chute or feed-pipe, being in cross-section in order to disclose the details of the automatic weighing apparatus. Fig. 2 is a side elevation, with the addition, however, of an ordinary poise. Fig. 3 is a sectional view taken through the line 3' of Fig. 1. Fig. 4 is an enlarged detail of the bottom of the feed-tube showing the shutters and their operation. Fig. 5 is a view of the spreader detached. Fig. 6 is an enlarged detail plan view of the upper portions attached to the feed-tube, certain parts being removed and others being shown in partial section; the heavy dotted outlines indicating the operating lever and adjacent parts in initial and normal position, the full lines indicating their secondary position, and the lighter dotted outlines indicating their final position for opening the feed shutters and discharging the desired quantity of the commodity into the weighing can, it being understood, however, that the balance of the weighing operation, that is, the weighing, the cutting off of the inflow by closing the feed shutters, the opening of the outlet so as to discharge the commodity from the weighing can, and the restoration of all parts to their initial and normal positions, are accomplished automatically. Fig. 7 is a vertical sectional view through the line 7' of Fig. 6. Fig. 8 is a view, partly in section, along the line 8' of Fig. 6. Fig. 9 is a view, partly in section, along the line 9' of Fig. 6. Fig. 10 is a side view of the slotted bar pivoted to the operating lever for operating the mechanism for closing the doors in the bottom of the weighing can. Fig. 11 is a sectional view taken along the line 11' of Fig. 12. Fig. 12 is a view of the mechanism more immediately involved in closing the exit openings of the weighing can, certain parts being shown in section, and the supporting bracket being broken away from the feed-tube. Fig. 13 is a side view of the upper rim of the weighing can showing especially the tripping mechanism for tripping the weighing can openings; Fig. 14 is a sectional view through the line 14' of Fig. 12; and Fig. 15 is a top view of the mechanism shown in Fig. 13, the tripping rod being shown in section. Fig. 16 is a view through the line 16' of Fig. 12. Fig. 17 is a view through the line 17' of Fig. 12. Fig. 18 is a view through the line 18' of Fig. 13. Fig. 19 is a sectional view, partially broken away, of the standard and weighing or compensating spring supporting the weighing can, and is taken approximately on the line 3'' of Fig. 2. Fig. 20 is a sectional view of the spring buffer, taken approximately on the line 20' of Fig. 1. Fig. 21 is a longitudinal sectional view of the weight-shifting device used for giving quick action to the scale when the desired weight is in the weighing can. Fig. 22 is a corresponding view of a part thereof. Fig. 23 is a view of certain parts taken approximately on the line 23' of Fig. 3. Fig. 24 is a plan view of a modified form of the weighing can and manner of hanging same. Fig. 25 is a plan view of a modified form of weighing apparatus, the weighing being done by the springs and the tripping being accomplished by means of an electric circuit and an electromagnet. Fig. 26 is a side elevation of same. Fig. 27 is a sectional view of the lower portion of the standard and showing the weighing spring and its attachment to the can. Fig. 28 is an enlarged view of the regulating device and indicator connected therewith, the indicator having its face removed and certain parts broken away and others shown in section. Fig. 29 is a view of the tripping mechanism in a modified form, taken approximately through the line 29' of Fig. 25. Fig. 30 is a top view of the same mechanism. Fig. 31 is a vertical section through the line 31' of Fig. 30. Fig. 32 is a view of the electric contacts and the clamp for adjusting same and supporting the indicator. Fig. 33 is a side elevation of a further modification and amplification of the embodiment of the principles of my invention, here showing four cans or reservoirs mounted upon a pedestal so as to revolve about the same, with a stationary automatic weighing apparatus shown in section approximately through line 33' of Fig. 37, and being adapted, for instance, to contain four grades of coffee and so arranged that the operator may by quick and simple operations bring any can into connection with the weighing apparatus and thus weigh out the desired quantity of the desired quality. Fig. 34 is a plan view of the support for the automatic operating mechanism. Fig. 35 is a vertical sectional view through the line 35' of Fig. 38. Fig. 36 is a similar view through the line 36' of Fig. 38. Fig. 37 is a top view of the weighing apparatus shown in Fig. 33. Fig. 38 is a view through the line 38' of Figs. 35 and 36. Fig. 39 is a vertical sectional view of one of the cans and its discharge tube with certain other adjacent parts shown approximately through the line 39' of Fig. 37. Fig. 40 is a plan view of the operating mechanism, enlarged, certain parts being shown in section. Fig. 41 is a detail of the modified form of discharge tube and shutters and shutter-operating means. Fig. 42 is a detail of the means for latching the automatic mechanism which operates the shutters. Fig. 43 is a side elevation of the automatic mechanism, enlarged, certain parts being shown in section. Fig. 44 is a sectional view through the line 44' of Fig. 40. Fig. 45 is a vertical sectional view of the lower end of the tubes and shutters shown in Fig. 43, but taken approximately through the line 45' of Fig. 41. Fig. 46 is a sectional view through the line 46' of Fig. 40.

Briefly summarized, Figs. 1 to 23, inclusive, show one form of the embodiment of my invention. In this form, the weighing is done by a scale beam with weights either removable or a shiftable poise or both. The weighing can is mounted at one end of the beam on springs which, as the can is filled from the discharge tube leading from the supply bin, permits the can to be lowered by the increasing weight therein, for the purpose of always keeping the surface of the commodity at about the same distance from the discharge, so that when the apparatus is adjusted to any number of pounds the stream flowing from the discharge tube will always be of about the same length. Fig. 24 is a modification of that apparatus by merely using four springs set at quarters, instead of two set opposite to each other.

Figs. 25 to 32, inclusive represents a substantially similar machine, but here the weighing is done by the said springs, the desired weight being gaged by the extension of the springs, and the electric current is used for automatically bringing into operation the shutter-operating mechanisms.

Figs. 33 to 46, inclusive, show substantially the instrumentalities of Figs. 1 to 23, slightly modified, but suitable for application to a series of main reservoirs or bins, but without the modifications of Figs. 25 to 32, and also without the springs for either compensating or weighing, the weighing can being rigidly and immovably attached to the scale-beam.

Similar reference characters indicate like or corresponding parts throughout the several views.

Referring firstly to the mechanism illustrated in Figs. 1 to 23, inclusive: A is a suitable weighing can of any suitable construction, here shown as a vertically disposed cylindrical metallic can, its upper end being open, and its lower end being provided with the two trap-doors or shutters *a*, *a*.

B represents any suitable means for conveying the commodity to be weighed to the weighing can, here shown as a discharge tube leading from a reservoir C, and provided at its discharge end with a pair of shutters *b*, *b*, whereby the flow of the commodity into the can is controlled.

The weighing can A is mounted on a suitable weighing apparatus, and the purpose of the details about to be described will be better understood by an explanation of the relation of the elements just named and their manner of coöperation, namely: The commodity flows from the feed-chute or discharge tube B directly into the weighing can, and not into a sack or other final container, as in other weighing machines. The weighing is regulated by adjusting the weighing apparatus in any ordinary method; for instance, if it be desired to weigh one pound of the commodity, a one pound weight is placed on the other end of a balance scale, or the poise is correspondingly adjusted. Then by the manual operation of a lever, the feed shutters *b*, *b* are opened and the weighing-can shutters *a*, *a* are closed, and the flow of the commodity continues until one pound of the commodity is in the weighing can, which actuates the weighing apparatus which in turn operates certain intermediate tripping mechanism which closes the feed-shutters and opens the weighing-can shutters and restores all parts to their normal and initial position. Furthermore, in the illustrations now referred to, the weighing can is suspended on springs which are so adjusted as to let down the weighing can as the commodity is discharged into same, so as to maintain the top of the commodity therein at about a constant level, that is, always at about the same distance from the discharge end of the feed-chute so that the stream cut off will always be of the same length whether one pound or four or any other number be weighed, and the can is also restored automatically to initial position. The commodity is discharged from the weighing-can through a suitable guiding chute or funnel into its final receptacle. W represents such a weighing apparatus, consisting of a beam or balance scale of a construction modified to suit the requirements of my invention.

1 is the hollow base; 2 is the standard on which is fulcrumed the beam 3, one end of which is divided into a yoke 4, 4, to which is pivoted the supporting ring 5 on which are erected a number of upright rods 6, 6, on the upper ends of which is mounted another ring 7. These rings and upright rods are for supporting the weighing-can and other apparatus as will be hereinafter explained.

8, 8 are a pair of hollow buffers to limit the range of action of the balance beam; 9 is the platform on which the weights are carried; 10 is a perpendicular rod rigidly secured to said platform (which is pivoted to the scale-beam); and 11, 11 are a pair of rods extending parallel with the balance-beam and pivoted in perpendicular alinement with the fulcrum thereof and also pivoted to said rod 10 and to the opposite rod 12 which is rigidly secured, by an elbow 13, to the supporting ring 5; whereby the platform is maintained in level position and the can support in proper perpendicular position in the manner well known in the art. The balance beam 3 has a U-shaped bend 14, and extending from the buffer 8 is a bracket 15 on which is pivoted a tilting support or tray 16 for a ball *d*. The bracket has its upper face cut at two angles 19 and 20, and a spring 18 is provided, the parts bearing such relations, as indicated in the drawings, that when the ball is placed well back in the tray the tray will, by virtue of the added weight of the ball, rest on the face 20 and thus hold the ball therein; but when the tray is tilted to rest on the face 19, the ball will roll off by force of gravity; the spring 18 being only of sufficient tension to cause the latter tilt when there is no weight on the tray, and not strong enough to raise the ball when in the former position.

21, 21 are a pair of arms extending from the tray and adapted to be free from the platform 9 when the platform is up (as in Figs. 2 and 3) and to be engaged by said platform when it is down (as in Figs. 21 and 22) to tilt the tray and cause the ball to roll off. Just opposite the tray 16 and on the platform 9 is another ball seat 22, and in front of this seat are some pins 23, 23 extending up from the balance-beam 3, and of such length and so disposed that when the platform is down these pins form a support for the ball to hold it in seat 22, but when the platform is up, the pins are below the bottom line of seat 22, and thus allow the ball to roll out of the seat 22; this differential movement being caused by reason of said platform traveling on an arc of greater radius than the radius from the fulcrum to the pins. And the parts are so arranged and adjusted that when the platform is down the ball will rest in seat 22, and when the platform is up, the ball will rest in seat 16; and the change from seat 22 to seat 16 is effected when the balance beam is midway between the two extremes, in other words when the exact balance is secured. And the object is this: When the platform is down, the weight of the ball is on the platform and balance-beam, but when the beam is at an exact balance, the weight of the ball is suddenly shifted from the balance-beam to the frame of the scale, and this sudden relief from the weight of the ball causes a sudden dropping of the other end of the scale-beam with the effect of quickly operating the tripping apparatus for closing the feed-shutters and opening the weighing can shutters, and thus also overcoming the friction which must necessarily exist in an automatic apparatus of this kind. This automatic weight or ball shifting contrivance is broadly referred to and indicated by the letter D.

Secured to the other buffer 8 is a bracket 24 through which passes the tripping rod 25 which has a yoke 26 to pass around the elbow 13, an extension spring 27 to hold it normally in elevated position, and a pair of arms 28, 28 which are engaged by the under side of the scale-beam or yoke 4, 4; these parts being so arranged that when the yoke end 4, 4 of the balance-beam is down, said rod is forced down against the tension of said spring by reason of the engagement by said yoke 4, 4 with said arms 28, 28, and when said yoke end is raised the spring forces said rod up, to operate the tripping mechanism heretofore referred to and hereinafter to be explained in detail.

The manner of suspending the weighing can is as follows: There are two oppositely arranged hollow standards 31, 31 secured in said rings 5, 7, and in each of these is an extension spring 32 secured to the upper end of the standard by an adjusting screw and nut 33, and at the lower end to a pin or lug 34 extending from the side of the weighing can A. These springs constitute a compensating mechanism for lowering the can as the commodity flows thereinto, so as to maintain a constant level therein. Rollers or sheaves 99, 99 may be provided for holding the can in proper erect position as it moves up and down; although by providing three or four such compensating springs, as in Fig. 24, the use of the guiding rollers may be dispensed with, thus avoiding their friction. At the upper end of two or more of the rods 6, 6 may be provided buffer springs 35 (see Fig. 20) inclosed in slotted sleeves 36, and engaged by the yoked arms 37 extending up from the upper rim of the weighing can. These buffer springs absorb the jar as the compensating springs 32 draw up the can after discharging the contents.

Each of the trap-doors or shutters at the bottom of the weighing can is operated and controlled by a cord, chain, or band 38, the upper end of which is fastened on a sheave 39 on a shaft 40, so that by turning the shaft the doors will be pulled shut, and by releasing the shaft, the doors will fall open either by force of gravity or by the weight of the contents in the can. This shaft is mounted at one end on an upright extension 41 of a bracket 42 secured to the rim of the can, and is operatively connected with the upright shaft 43 by the miter gears 44; and the shaft 43 has a forked upper extremity 45, by the operation of which said shutters may be closed. Secured to the other end of the shaft 40, which may be mounted in a bracket or bearing 47 on the rim of the can, is an arm or segment 46, which is provided with a series of holes 48, 48, in one of which is a pin 49 adapted to strike against the upper edge of the can, its purpose being to limit the degree of opening of the shutters, and being adjustable by said several holes. Attached to the can is a latch 50 with a spring 52 pressing it inwardly and having a shoulder 51 to engage the arm or segment 46 when the shutters are closed and thus adapted to hold said shutters closed, and also by being pressed outwardly as by the arm 53 to release said arm 46 and thus permit the shutters to fall open:

54 is a rod extending the length of the can and supported at its lower end on the bracket 24 and at its upper end in a bracket 55 and having another rod 56 secured parallel thereto by rigid connecting rods 57, 57. At the lower end is a laterally extending projection, pin, or lug 58 adapted to engage a pin 59 in said bracket 24, and at the upper end is a coil spring tending naturally to hold said rod with pin 58 against pin 59, in which position rod 56 is clear of arm 53; but by turning rod 54 against the tension of said spring, the rod 56 will press out the arm 53 and latch 50 and thus free arm or segment 46 from said latch 50 permitting the shutters to fall open. By extending this latch operating rod the full length of the can as shown, it will thus be capable of opening said shutters in whatever position the can may be when said rod is operated as just described.

Secured to the upper end of the latch operating rod 54 is a wheel or segment 61 having a tooth 62 (see Fig. 6) adapted to be engaged by a notch 63 in a rod 64 which is pressed against said segment by a spring 66 against a shoulder 67. Rod 64 is adapted, by mechanism hereinafter to be explained, to move back and forth against said toothed segment, being in one position drawn back (to the right as indicated by the dotted outline in Fig. 6) until notch 63 engages tooth 62, in which position the parts correspond to the position of the parts shown in Fig. 15 hereinbefore explained in detail; the forward movement (toward the left in Fig. 6) will turn the rod 54 against the tension of the spring 60, and thus release the weighing-can shutters, as explained, but a following tooth 62' serves to press the rod 64 away from said segment 61 and releases tooth 62 from notch 63, whereupon the spring 60 again returns the parts to normal position as indicated in Figs. 6, 13, and 15. This forward movement of rod 64 is very quick, the action of releasing the shutters and returning the latch-operating rod 54 to normal position being almost instantaneous, it being understood that tooth 62 is not released from notch 63 until it has traveled far enough to release the shutters. There may be a protecting and retaining plate or shield 65 above said segment 61.

Extending from the feed-chute or other part of the frame is a bracket 70, through which is extended a shaft 71 having at its lower end a cross-rod 72, 72 which is adapted to engage between the forks 45 of the shaft 43 to close the weighing can shutters, the forks being somewhat far apart in order to allow of considerable variance, and so that as the can is returned to normal upper position said forks will always be certain to come into register with said cross-rod 72, it being understood that the forked shaft 43 is secured to the can and moves up and down therewith, while the shaft 71 is vertically stationary.

73 is a pin projecting laterally from shaft 71, and 74 is a spring which is adapted to press the shaft so as to bring said pin to the position indicated by the heavier dotted outline in Fig. 6 which is its normal position, being in this position so adjusted that as the weighing can is drawn up, after discharging its contents, with the doors or shutters open, said cross-rod 72 and said forks 45 are in the positions shown in the dotted outline in Fig. 11.

75 is a lever, being the main operating lever or handle, pivoted at 76' to a plate 88, hereinafter to be referred to; and 76 is a rod pivoted to said lever 75 and adapted to operate the rod 73 which extends through the slot 77 therein; these parts being so arranged and adjusted that when in their initial or normal position (as in the heavier dotted outlines in Fig. 6) the cross-rod 72 will engage between the forks 45, and when the lever 75 is shifted to its secondary position as indicated by the full lines, the said weighing-can shutters will thereby be closed, and the further travel of said lever 75 to its third position, as indicated by the lighter dotted outlines in Fig. 6, said rod 73 will not thereby be further operated, but will on the other hand by reason of the sloping end of said rod 76 be allowed to retract slightly so as to release said cross-rod 72 from a close engagement with forks 45 after having closed the shutters which are then held closed by the latch 50 as hereinbefore fully explained in detail. When lever 75 is returned to initial position, shaft 71 will also return thereto by spring 74.

The feed-shutters b, b are rigidly secured to the lower ends of the rods 80, 80 and are operated thereby, each shutter comprising a semi-circular plate covering half the opening and butting against a post or pin 81, to prevent dulling their sharpened meeting edges or folding. (See Fig. 4.) Rods 80, 80 extend up along the outside of the feed-chute B, and each is provided with a coil spring 82 which tends naturally to keep it in closed position against pins 81, and the spring may be inclosed in a sleeve 83 and at its upper end each rod 80 carries, keyed thereto, a small gear 84.

Rigidly secured to the feed-chute B is a circular plate 30 having in its upper surface an annular groove or channel 85 in which movably fits a ring 86 provided with teeth 87 in its inner edge to mesh with said gears 84. Secured to said ring is a plate 88 to which the operating lever 75 is pivoted and which is provided with a shoulder 79 adapted to be engaged by a pin 78 in said lever 75, and so arranged that said pin will not engage said shoulder until it has traveled from its initial position (shown in the heavier outlines in Fig. 6) to its secondary position, but engaging said shoulder and moving said entire ring in traveling from its secondary to its third position as indicated in the lighter dotted outlines in Fig. 6. Also secured to said ring is an arm 89 which has at its outer end a notch or tooth 90 adapted to be engaged by the inner end or nose 90' of a lever 91 which is pivoted at its outer end to the tripping rod 25. Said lever is pivoted between suitable lugs on the bracket 92 which is rigidly secured to the tube B, and of which bracket 55 is an extension. The rod 64 is also pivoted to said ring 86. The plates 93, 93 (one of them being removed in Fig. 6) may be provided to cover said ring and securely retain it in place. Normally the ring is held in the position shown in Fig. 6 in full lines, by reason of the tension of the springs 82 action through the rods 80, 80, gears 84, 84, and teeth 87. It may be moved, against the tension of said springs, to the position shown in the lighter dotted outlines in Fig. 6 by the operation of the lever 75, so as to open the feed shutters, pull back the trip rod 64, and bring tooth 90 into engagement with the inner end of lever 91, said rod 25 being pressed up by its spring 27 by reason (when weighing) of the weights on the platform 9. And when said trip-rod 25 is pulled down by the action of the scale-beam as hereinbefore explained in detail, said notch 90 is released from said lever 91, and the springs 82 instantly return the ring and attached parts to normal position, the operation of the several elements having hereinbefore been fully explained. The apparatus may be supported on a suitable table 94, and a guiding funnel 95 should be provided under said can to guide the discharged commodity from the weighing can into the bag or other final receptacle. At the bottom of the feed-chute there may be provided a spreader (see Fig.

5) of any suitable type to spread the commodity well out in the can and preventing piling up in the middle.

As a convenient method of supporting the bag or other final receptacle, I refer to Fig. 33, where I have shown a platter 96 supported on a bracket 97 pivoted, 98, to the table-leg or frame-work.

Explaining the operation of the automatic weighing machine as a whole: A weight (for instance, a two-pound weight) is placed on platform 9, which carries down platform 9, throws part D to position shown in Fig. 21, raises the yoke end 4 of scale-beam, which raises trip-rod 25; a bag is placed under funnel 95; lever 75 is shifted from its initial position (X in Fig. 6) to its third position, the initial movement closing the weighing-can shutters and the rest of the movement revolving the ring 86, to open the feed-shutters, to draw back the rod 64, and to engage notch 90 by lever 91 which holds the ring in such shifted position; now, the balance of the movement in weighing is entirely automatic: the commodity flows through the feed chute into the weighing can, said weighing-can falling by virtue of the tension on the springs 32, until the weight of two pounds is attained in the weighing can, whereupon said yoke end 4, 4 will be depressed, shifting the ball d, suddenly pulling down trip-rod 25, releasing notch 90 from lever 91, permitting springs 82 to close feed-shutters and return ring 86 to normal position, which in so returning releases weighing-can shutters through rod 64, rod 54 and latch 50, and which also throws lever 75 around to initial position with shaft 71 also in initial position, and as the commodity runs out of the weighing-can, the springs 32 return the can to initial position, and the commodity is discharged down through the guiding funnel into the bag. Should the next quantity desired be also two pounds, the action may be repeated by merely placing the bag under the funnel and shifting the operating lever. To change the quantity, simply change the weight on the platform 9, as in ordinary use of scales; or the poise 211 on the beam 210 may be shifted for smaller differences, or both the weights and the poise may be used in the usual manner.

The use of the spreader may be proper or not according to the commodity; thus it may be used for weighing sugar; but in weighing coffee, I prefer, on the contrary, to reduce the opening at the bottom of the feed-chute, as will be explained.

Referring now to the modification shown in Figs. 25 to 32, inclusive: The supporting ring 5 is stationary being mounted, for instance, on the feet or legs 115, but carrying the upright rods 6, 6, and the hollow standards 31, and the upper ring 7, as in the first-described type. The can, the exit-shutters therefor, the feed-tube B and shutters, the plate 30, and the ring therein, the operating handle 75, the weighing-can shutter operating mechanism and the arrangement for holding the ring in secondary position, are all substantially similar to the corresponding parts of the type first described. Instead, however, of using the segmental arm 46, I here provide a simpler form (see Figs. 29, 30, and 31) in the shape of the laterally-extending arm 123, and the latch 50 is provided with a nose 124, instead of a shoulder; and though the arm 123 extends from the opposite side of the shaft 40, yet the movement is exactly the same, with relation to the operation of the weighing-can shutters. The latch-tripping rod 54 is also arranged between the two rings 5 and 7 on the other side of the can, and the toothed member 61 and notch 63 are reversed in order that their action shall correspond.

Standing between the two rings 5 and 7, and connected thereto so as to be insulated therefrom, is a rod 100, from which extend two brackets 101, to which is secured a rod 102, parallel with said rod 100 and provided in one side with depressed teeth or cogs adapted to mesh with a large gear 109. 104 is an adjustable clamp embracing said rod 100 and provided with a spring-pressed pin 105 adapted to engage in holes 106 arranged in the corresponding face of said rod 100. 107 is a bracket extending from said clamping member 104 and supporting an index F, comprising a round frame or casing 108 in which is pivoted the gear 109 to the shaft or spindle of which is secured the index-hand 110 which rotates over a face suitably inscribed in the usual manner of such indexes. An insulated roller or sheave 111 is pivoted to the rear of the casing 108 and engages with the adjacent rod 6, which thus serves as a guide. By reason of the insulation of the rod 100 and the insulated roller 111, said rod 100 and the index F are thus insulated from the balance of the machine. Rod 100 is extended down through ring 5, and is connected by wire 112 with an electromagnet 113, the return wire of which, 114, is connected with any metallic part of the machine, as for instance with one of the feet 115 as shown. A battery LB is provided. Attached to the upper edge of the weighing-can A is a contact 116 which forms one contact or pole of the circuit leading through said battery and electromagnet by reason of its connection with wire 114 and the metallic parts of the machine, it being understood that the entire machine, except as otherwise specified is of metal. Extending in the path of said contact 116 and secured to the clamp 104 is a contact 117, which is connected to the opposite pole of the battery and electromagnet through rod 100 and wire 112. I have also modified the form of the lever 91 by extending the arm perpendicularly, 118, though the nose 90' is similar to that in the former instance. A link connects lever 118 with an armature 120 of said electromagnet, and this armature may be supported on an arm 121 pivoted to the frame or bracket 122. The springs 32 in this instance serve the double purpose of compensating, as in the former instance, and also of weighing, and obviously require a delicate adjustment for accurate weighing, the weight depending, as usual, upon the extension of the springs. The index is so adjusted that when the clamp 104 is run up to the uppermost notch, the hand 110 will point to zero, but when the clamp is lowered to the point at which contacts 116 and 117 will touch by reason of the extension of said springs 32, 32 said hand will point to the number of pounds on the index-face causing such degree of extension, said hand being operated by reason of the engagement of the gear 109 with the teeth 103. In the drawing the machine is set to weigh four pounds. So far as the operator is concerned, the operation is the same as in the former instance, except that the weight is adjusted by means of running the clamp 104 up or down on said rod 100. Nose 90' is withdrawn from notch 90 when the circuit is closed by reason of the contact of 116 with 117, thus electrically releasing ring 86.

Referring now to the form of my apparatus illustrated in Figs. 33 to 46, inclusive: Four cans C', C', C', C', each forming the quarter of a circle, are disposed around a spindle 150 and pivotally mounted on a pedestal 151, and each has a hopper-like bottom 152 sloping down to an opening 154, and a lid 153. B'' is a tube fitting snugly through said opening 154 and adapted to be moved up and down therein. The lower end of the tube B'' is reduced or choked, 155; and this choke I find to be proper when using the machine for weighing coffee to keep always a uniform stream of coffee discharging from the lower end, instead of permitting it to run out faster than it fills in at the upper end and thereby varying, it being understood that the four cans are for the purpose of containing four different kinds or grades of coffee, either of which cans may be brought into connection with the weighing machine W by a simple operation. Secured to the upper end of tube B'' is a lug 156 extending toward the side of the can and fastened, to the inner face of a slip-collar 157 (see Figs. 35, 36 and 38) which has a pair of lugs or arms 159, 159 extending out through a slot 163 in the side of the can and between which is secured the inner end of a handle 165. The lug, slip-collar, and handle may be secured together by means of bolts 162, 162. Collar 157 embraces a band or strip 160 which is secured at its bottom end to the can and which extends upward and is wide enough to cover slot 163 and overlap the edges thereof. Secured to the inside of the can on both sides of said strip 160 are the strips 161, 161, whose inner edges overlap the respective edges of said strip 160, it being understood that these strips 161 are secured at their outer edges to the can, their inner edges being loose, and that they extend the full length of said slot 163. The can may be reinforced, 164 around the edges of the slot. Strips 160, 161, and 161, are made of very flexible and smooth metal, for instance of polished thin spring brass, and in the absence of slip-collar 157 press tightly against the side of the can forming a tight closure therefor, and the parts are so adjusted and arranged, by rounding off the inner face of the slip-collar when the strips 161 pass over it (see Fig. 36), that the slip-collar may be moved up and down in the slot 163 without leaving any opening through said parts; and thus the tube B'' may be raised and lowered thereby by a convenient means without opening the can or letting any coffee run out, or admitting air thereto, making a commercially air-tight coffee can. Arranged under said cans is a bracket or support 166 with a brace 167, for supporting the automatic weighing mechanism hereinafter to be described and which is shown in detail in Figs. 40 to 46, Fig. 39 being intended merely to exhibit the relative arrangement of the cans, stand, bracket and tubes. From this bracket depends a tube B''', and the different cans are brought into communication with the weighing machinery through this tube; thus, in Fig. 39 it is noted that the tube B'' is pressed down into tube B'''. To bring another can into communication with the weighing machinery, handle 165 will be raised so as to raise tube B'' out of tube B''', the cans may then be turned around pivot 150 until the can containing the desired kind or grade of coffee is brought to register its tube B'' with the tube B''' and said tube B'' is then depressed, by handle 165 into tube B'''. And thus the cans may be brought into communication with the weighing apparatus without opening the cans.

To the underside of bracket 166 is secured a plate 168 by screws 169. This plate has an annular groove or channel 170, in which movably fits a ring 171 to which the tube B''' is rigidly secured. From the underside of plate 168 depend a number of hangers 172 carrying at their lower ends a ring 173 loosely embracing tube B''' and serving merely to brace the same. A plate 174 is fastened to the upper face of said ring 171, and has a slanting forward end 175, a ridge or hump 176, and a contour corresponding to that of the ring.

177 is a depression in the face of the ring and the adjacent portion of the plate to permit the movement of a pin 178 which is so extended down from the inner end of lever 179 pivoted at 180 as to be moved back and forth as said ring (and with it said plate 174) is moved back and forth by reason of the engagement of said pin with said slanting face 175, the return being effected by a spring 183. The outer end of lever 179 has a segmental gear 181 which meshes with a gear 182 which is keyed onto the upper end of the shaft 71 hereinbefore fully described. The weighing-can shutters are closed by the operation of the lever 179, which causes the same movement of said shaft 71, the hump 176 serving to close the shutters tightly and then relax slightly as the pin rides over the following outer edge of the plate 174.

The upper end of rod 54 is pivoted in a plate 184 which is supported at the lower end of a hanger 185, and spring 66 presses against a pin 186 also on said plate 184. The other end of rod 64 is pivoted (see Figs. 40 and 46) to a lever 187 fulcrumed in a bracket 188 depending from the thicker and inner part 189 of the plate 168. Lever 187 extends through an opening 187' in plate 168, and is actuated in one way by the spring 190 to draw back the rod 64, and in the other way to cause the kicking off of the latch-tripping-rod 54, by a lug 191 secured to the ring 171 and is normally held against the tension of said spring by said lug, as indicated in the drawings.

192 is a rather strong extension spring by which the parts are held in normal position and returned thereto; one end is secured to the ring 171, and the other end to the plate 168 by a hook 193, which is of the peculiar form shown in order to permit the passage of the lug 191 thereunder.

The rod of the operating handle or the lever 74 has an upward bend 194 and is connected at its inner end to the ring 171 and tube B''' through, and it works in, a slot 196 in the plate 186 under said ring 171, the inner end of said operating lever being indicated by the numeral 195 (See Fig. 44).

197 is a lug or bracket depending from plate 168, and to this lug or bracket is pivoted the lever 91, the inner end or arm of which extends upwardly, 198, so as to be adapted to engage a notch 199 in the outer edge and under surface of the ring 171 when the ring is turned around (by lever 75) far enough to bring said notch in line with said nose 198; and this represents the arc described by said lever and ring and connected parts in an operation of weighing.

Each tube B'' is provided at its bottom with a pair of shutters b, b, each shutter being rigidly secured to a short rod or pin 202 the outer end of which is lodged in a bracket 201, and the inner end or portion of which extends into and through a channel 204 formed by reason of the "choking" of the lower end of the tube. A spring 203 is provided for each shutter to keep it closed and to return it to closed position during operation. Butting or stop pins 81, 81 are provided as in the former instance. Each shutter has, preferably opposite its pivotal point, an outwardly extending pin 205. Secured to the lower end of the outer tube B''' are two shutter-operating lugs; they extend downwardly and inwardly, one for each shutter, and they are so disposed, as more clearly observable in Fig. 41, that when the outer tube B''' is rotated in the direction of the arrow, each lug 206 will strike against its shutter-pin 205 and carry said pin in front of it so as to open said shutters; and upon said outer tube returning to normal position, said shutters will be closed by said springs 203.

The outer end of the bracket 166 may be made to conform to the shape of the arc described by the upturned portion 194 of the operating lever, and may have a spring 200, which merely acts frictionally to hold said lever in normal position, said friction and pressure being easily overcome when merely shifting the lever in the operation of weighing, but being sufficient to prevent the lever from rebounding.

The operation is as follows: Shift the lever 75 until notch 199 comes into engagement with nose 198 (approximately ninety degrees). The initial movement, through the operation of lever 179, closes the weighing-can shutters. The remaining movement draws back rod 64 and opens the feed-shutters. On the desired weight having flowed into the can, nose 198 is withdrawn from notch 199, which permits spring 192 to instantly restore the parts to normal position. It is to be understood that in this last-described form of my automatic weighing apparatus, I use the weighing apparatus W heretofore described in detail, and the mechanically-operated tripping rod 25 also fully described. Also, in this construction of an apparatus for weighing the several grades of coffee, I prefer to rigidly attach the weighing-can A to the supporting ring 5, and thus do away altogether with the springs 32, 32. The stream of coffee is quite light, and the difference in weight caused by cutting off a long stream or a short one is negligible, or indeed, compensation may be made by adding a little to the smaller weights. The tubes B'' and B''' should come only just below the upper rim of the weighing can.

What I claim is:

1. In an automatic weighing machine, the combination with a weighing apparatus having a suitable container with an exit opening and a shutter therefor, a feed chute leading to said container and a shutter therefor, a lever for closing the exit shutter and opening the feed shutter, latches for holding the exit shutter closed and the feed shutter open, spring-actuated means for closing said feed shutters, a trip controlled by the weighing apparatus to release the feed shutters and permit them to be closed by said spring-actuated means, a trip controlled by said weighing apparatus to permit the opening of the exit shutter, and means for adjusting the control of said shutters by said weighing apparatus according to the weight within said container.

2. In an automatic weighing machine, the combination with a weighing apparatus having a suitable container with an exit opening and a shutter therefor tending naturally to an open position, of a feed chute for the container having a shutter tending naturally to a closed position, a lever to close the exit shutter and open the feed shutter, and connecting mechanism between the weighing apparatus and said shutters and automatically controlled by said weighing apparatus for tripping said shutters to permit the feed shutter to close and the exit shutter to open; together with means for adjusting the said automatic control over said shutters according to the weight in said container.

3. In an automatic weighing machine, the combination with a weighing apparatus having a container with an exit opening at the bottom and a shutter therefor tending naturally to an open position, of a feed chute for the container having a shutter tending naturally to a closed position, a lever to close the exit shutter and open the feed shutter, latches for holding the exit shutter closed and the feed shutter open and connecting mechanism between the weighing apparatus and said shutters and automatically controlled by the weighing apparatus for tripping the shutters to permit the feed shutter to close and the exit shutter to open.

4. In an automatic weighing machine, the combination with a weighing apparatus having a container with an exit opening at the bottom and a shutter therefor, of a feed chute for the container and a shutter therefor, means for closing the exit shutter and opening the feed shutter, a spring-pressed mechanism for releasing the exit shutter and closing the feed shutter, a latch for holding the feed shutter open and the exit shutter closed and automatically controlled by said weighing apparatus, and means for adjusting the control over said latch by said weighing apparatus according to the weight in the container.

5. In an automatic weighing machine, the combination with a weighing apparatus having a container with an exit opening at the bottom thereof and a shutter therefor, of a feed chute leading to said container and a shutter therefor, a means for closing the exit shutter, a manually-operated means for opening the feed shutter, a means for normally restraining the exit shutter from opening, an automatic means for releasing the exit shutter and closing the feed shutter, a trip rod connecting the weighing apparatus with the automatic means and controlled by the weighing apparatus, a frame for the weighing apparatus, a balance-beam therefor, and a weight supported alternately on said frame and said balance-beam and automatically shiftable from the one to the other whereby when the desired weight is attained in the container, said shiftable weight will automatically shift from said balance-beam to said frame.

6. In an automatic weighing machine, the combination of a weighing apparatus having a container with an exit opening and a shutter therefor, a feed chute and a shutter therefor, means for closing the exit shutter and opening the feed shutter, automatic means for closing the feed shutter and releasing the exit shutter, latches for holding the feed shutter open and the exit shutter closed and controlled by the weighing apparatus, and means for adjusting the control over said latches by the weighing apparatus according to the weight within the container; said weighing apparatus including a frame, a balance-beam fulcrumed thereon and sustaining said container on one arm, a counterweight at the other arm of said balance-beam adapted to be supported alternately upon said balance-beam and upon said frame, and automatic means for shifting said counterweight from said balance-beam to the frame.

7. In an automatic weighing machine, the combination of a frame, a balance-beam fulcrumed therein, a container sustained by one arm of the balance-beam, a bracket on the frame and a tilting tray pivoted thereto, a ball supported alternately on the tray and on the other arm of the balance-beam, and means for automatically shifting the ball from the arm to the tray.

8. In an automatic weighing machine, the combination of a frame, a balance-beam fulcrumed therein, a container sustained on one arm of the balance-beam, a tray mounted on the frame, and a ball supported alternately on the other arm of the balance-beam and on the tray and automatically shiftable from the one to the other.

9. In an automatic weighing machine, the combination of a frame, a balance-beam fulcrumed therein, a container supported by one arm of the balance-beam, a tray pivoted on the frame, a platform pivoted to the other arm of the balance-beam, and a ball supported alternately on said platform and on said tray and automatically shiftable from the one to the other.

10. In an automatic weighing machine, the combination of a frame, a balance-beam fulcrumed therein, a container supported by one arm of said balance-beam, a tilting tray pivoted on the frame, a platform pivoted to the other arm of the balance-beam, ball-seats on said tray and platform respectively, said seats being arranged oppositely to each other, and means for automatically shifting the ball from the one seat to the other.

11. In an automatic weighing machine, the combination of a weighing apparatus having a suitable container with an exit opening at the bottom and a shutter therefor tending naturally to open position, a commodity reservoir, a feed chute leading from the reservoir to the container and a shutter therefor tending naturally to closed position, a latch to hold the exit shutter in closed position, a latch to hold the feed shutter in open position, a lever for closing the exit shutter and opening the feed shutter, a trip rod and suitable connecting mechanism between the weighing apparatus and the said latches and controlled by the weighing apparatus for unlocking said latches and permitting said shutters to go to the positions of their natural tendencies respectively, and adjustable counterweights for varying the control by said weighing apparatus over the trip rod according to the weight of the commodity within the container.

12. In an automatic weighing machine, the combination of a weighing apparatus having a suitable container with an exit opening at the bottom and a shutter therefor tending naturally to open position, a commodity reservoir, a feed chute leading from the reservoir to the container and a shutter therefor tending naturally to closed position, a latch to hold the exit shutter closed, a latch to hold the feed shutter open, a manually operable lever for closing the exit shutter and releasing the feed shutter, a trip rod and suitable connecting means between the weighing apparatus and the latches and automatically operable by the weighing apparatus for simultaneously unlocking both latches to release the exit shutter and close the feed shutter, a counter-weight for the weighing apparatus opposed to the container, means for automatically and suddenly relieving the container of the opposition of the counterweight and thereby operating the trip rod, and adjustable means for regulating the control of the trip rod by the weighing apparatus.

13. In an automatic weighing machine, the combination of a weighing apparatus having a suitable container and an exit opening and a shutter therefor, a plurality of commodity reservoirs, a suitable guiding chute leading from the container to the place of delivery, a feed-chute for each reservoir and a shutter for each feed-chute tending naturally to closed position, a means associated with the weighing apparatus for closing the exit shutter, means for bringing the respective reservoirs into register with the said container, a manually operable means associated with the weighing apparatus for opening the feed shutter of the reservoir so brought into register, a latch for holding the feed shutter open and a latch for holding the exit shutter closed, a trip rod and connections extending between the weighing apparatus and the said latches and controlled by the weighing apparatus for automatically unlocking said latches, and adjustable means for regulating the control of the weighing apparatus over the trip rod according to the weight within the container.

14. In an automatic weighing machine, the combination of a plurality of commodity reservoirs and a single automatic weighing apparatus; a container associated with said weighing apparatus and having an exit opening and a shutter therefor, a guiding chute leading from the exit opening to a place of final delivery, a feed-chute and a shutter therein for each reservoir and arranged so that said feed-chutes may be brought one at a time into register with the container, a manually operable lever for opening the feed-shutter so brought into register, a means for closing the exit shutter, a means for normally restraining the exit shutter from opening, and automatic connections between the weighing apparatus and the shutters for simultaneously releasing the exit shutter and closing the feed shutter; together with adjustable means for regulating the control of said shutters by said weighing apparatus according to the weight in the container.

15. In an automatic weighing machine, the combination of a suitable weighing apparatus having a container with an exit opening and a shutter therefor tending naturally to open position, a latch for holding said shutter closed and a means for closing said shutter, a manually operable lever and mechanism associated with the weighing apparatus for opening a feed-shutter, said lever and mechanism being spring-pressed and tending naturally to a position corresponding to the closed feed-shutter, a latch for holding said mechanism against the tension of the spring, a trip rod and connections extending between the weighing apparatus and said latches and controlled by said weighing apparatus for unlocking said latches simultaneously, and means for regulating the control according to the weight in the container; a plurality of commodity reservoirs, a telescoping feed-chute for each reservoir and a shutter therefor tending naturally to closed position, said feed-chutes being adapted to be brought one at a time into register with the container and into operable communication with said manually operable lever and mechanism associated with the weighing apparatus aforesaid.

16. The combination of a frame, a plurality of suitable commodity reservoirs pivotally mounted thereon each reservoir having a hopper-like bottom, a tube for each reservoir extending through the bottom and movable vertically and provided with shutters and springs normally holding them closed; a suitable weighing apparatus having a weighing container with an exit opening and a shutter therefor, a guiding chute leading from the opening to a place of final delivery, a means for closing the exit shutter and a latch for holding it closed; a spring-pressed lever and a latch for holding it against the tension of the spring, shutter-operating devices connected with said lever; a trip rod and connections extending between the weighing apparatus and the latches and automatically controlled by the weighing apparatus for unlocking said latches, and means for regulating said control; said reservoirs being arranged to be brought one at a time into register with the weighing container and with their respective tubes and shutters into communication with said shutter-operating devices.

17. In an automatic weighing machine, the combination of a single weighing apparatus having a suitable weighing container and an exit opening and a shutter therefor, a guiding chute leading from the opening to a place of final delivery, a plurality of reservoirs each provided with suitable feed-chutes and feed-shutters, a means for bringing said reservoirs one at a time into register with the weighing apparatus and into engagement with the feed-shutter-operating mechanism, a lever to open the feed-shutter so brought into register, a means for closing the exit shutter, a means for normally restraining the exit shutter from opening, and automatic means associated with the weighing apparatus for simultaneously closing the feed-shutter and releasing the exit-shutter.

18. In an automatic weighing machine, the combination of a single weighing machine having a suitable weighing can with an exit opening and a shutter therefor tending naturally to open position, a means for closing said shutter, and a latch for holding it closed; a guiding-chute leading from the exit opening to a place of delivery; a plurality of commodity reservoirs adapted to be brought one at a time into register with said weighing can, a feed-chute for each reservoir and a shutter for each feed-chute tending naturally to closed position; a manually-operable lever associated with the weighing apparatus and suitable mechanism connected therewith for opening the feed-shutter of the reservoir so brought into register, a latch for holding said feed-shutter open, a trip rod and connections between the weighing apparatus and said latches and controlled by said weighing apparatus for unlocking the latches and permitting the feed-shutter to close and the exit-shutter to open simultaneously; together with adjustable means for regulating the control over said trip rod by the weighing apparatus according to the weight in the weighing can.

19. In an automatic weighing machine, the combination of a vertically movable weighing can, a feed-chute having its discharge end at a constant level, means for automatically shutting off the feed and discharging the commodity from the can simultaneously when a predetermined weight is attained in the can, means for adjusting said automatic control for various weights, and means automatically controlled for always maintaining the same distance between the discharge end of the feed-chute and the level of the commodity in the can at the moment of shutting off.

20. In an automatic weighing machine, the combination of a suitable weighing apparatus having a weighing can supported therein, extension springs for supporting said can, an exit opening at the bottom of the can and a shutter therefor, a feed chute adapted to discharge its contents into the can and a shutter therefor, said feed chute being stationary and said weighing can being movable vertically with and against the tension of the supporting springs, means for automatically closing the feed shutter and releasing the exit shutter simultaneously when a predetermined weight is attained in the can, means for adjusting said automatic means to respond to various weights, and said springs being so adjusted as to permit the weighing can to descend in a degree corresponding to the flow of the commodity into the can so as to maintain a constant level in the can with relation to the discharge end of the feed chute.

21. In an automatic weighing machine, the combination of a suitable weighing apparatus including a weighing can having an opening at its bottom and a shutter therefor, a discharge chute leading to said can and a shutter therefor, means for closing the weighing can shutter and for opening the feed shutter, and means for automatically and simultaneously closing the feed shutter and releasing the weighing can shutter, said means including a latch and a latch-operating mechanism comprising a rod, a member secured thereon and having a notch and a following tooth, a reciprocating rod having a notch to engage the first-named notch, and said following tooth being adapted to engage said reciprocating rod and throw it out of engagement, and said first-named rod being spring-pressed and adapted to return to normal position.

22. In an automatic weighing machine, the combination of a suitable weighing apparatus including a vertically movable weighing can having at its bottom an exit opening and a shutter therefor, a stationary discharge chute leading to said can and a shutter therefor, a lever pivoted to said chute, a shaft operable by said lever and extending downwardly and provided with oppositely extending arms, an upwardly extending shaft mounted on the weighing can and connected with the exit shutter to close said shutter, and having its upper end forked to engage said oppositely extending arms, substantially as set forth.

23. In an automatic weighing apparatus, the combination with a suitable weighing apparatus, a plurality of reservoirs adapted to be brought one at a time into communication with said weighing apparatus, and each provided with a tube for making an operative connection therewith, and said tube having the following operating connections: the reservoir provided with a vertical slot, a flexible metallic strip overlapping said slot fastened at the bottom and disposed inside the can snugly against the wall around said slot, other flexible metallic strips secured by their outer edges to the said wall and extending the length of the slot and on opposite sides thereof and overlapping said first-mentioned strip, a slip collar extending through said slot, embracing said first-mentioned strip and passing between all three of said strips and secured to said connecting tube and provided with an operating handle, substantially as set forth.

In testimony whereof I have hereunto signed my name in presence of subscribing witnesses.

CHARLES D. SCOTT.

Witnesses:
   Z. T. FISHER,
   C. J. ROSEN.